(12) United States Patent
Michaux et al.

(10) Patent No.: US 8,550,162 B2
(45) Date of Patent: Oct. 8, 2013

(54) COMPOSITIONS AND METHODS FOR WELL CEMENTING

(75) Inventors: Michel Michaux, Verieres-le-Buisson (FR); Jean-Philippe Caritey, Le Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 176 days.

(21) Appl. No.: 13/171,043

(22) Filed: Jun. 28, 2011

(65) Prior Publication Data

US 2012/0006546 A1    Jan. 12, 2012

(30) Foreign Application Priority Data

Jul. 7, 2010 (EP) ..................................... 10290376

(51) Int. Cl.
| | |
|---|---|
| *E21B 33/13* | (2006.01) |
| *C04B 24/26* | (2006.01) |
| *C04B 28/02* | (2006.01) |
| *C04B 14/00* | (2006.01) |
| *C08K 3/00* | (2006.01) |
| *C08K 5/00* | (2006.01) |
| *C08K 5/53* | (2006.01) |
| *C08K 3/38* | (2006.01) |
| *C08G 18/48* | (2006.01) |

(52) U.S. Cl.
USPC ........ 166/292; 524/3; 524/4; 524/5; 524/123; 524/130; 524/404; 524/405; 106/724; 106/726

(58) Field of Classification Search
USPC ......... 166/292, 293; 106/274, 275; 524/3–5, 524/130, 404–405, 123
See application file for complete search history.

(56) References Cited

U.S. PATENT DOCUMENTS

| | | | |
|---|---|---|---|
| 5,503,671 | A | 4/1996 | Casabonne et al. |
| 5,503,672 | A | 4/1996 | Barlet-Gouedard et al. |
| 5,536,311 | A | 7/1996 | Rodrigues |
| 6,277,900 | B1 | 8/2001 | Oswald et al. |
| 6,978,835 | B1 | 12/2005 | Reddy et al. |
| 7,244,303 | B2 | 7/2007 | Chatterji et al. |
| 2002/0107310 | A1 | 8/2002 | Shendy et al. |

FOREIGN PATENT DOCUMENTS

| | | |
|---|---|---|
| EP | 0621247 | 10/1994 |
| EP | 0633390 | 1/1995 |
| EP | 1886980 | 2/2010 |
| JP | 6048797 | 2/1994 |
| WO | 9748879 | 12/1997 |
| WO | 2009015520 | 2/2009 |

OTHER PUBLICATIONS

Nelson EB and Michaux M: "Chemistry and Characterization of Portland Cement", in Nelson EB and Guillot D (eds): Well Cementing, 2nd Edition, Schlumberger, Houston (2006) 23-48.
Nelson EB, Michaux M and Drochon B: "Cement Additives and Mechanisms of Action" in Nelson EB and Guillot D (eds.): Well Cementing, 2nd Edition, Schlumberger, Houston (2006) 49-91.

*Primary Examiner* — Angela M DiTrani
*Assistant Examiner* — Silvana Runyan
(74) *Attorney, Agent, or Firm* — Michael Dae

(57) ABSTRACT

A retarder aid increases the applicable temperature range of phosphonate/borate cement-retarder systems to at least 302° C. (575° F.), and 207 MPa (30,000 psi). The retarder aid comprises a terpolymer of styrene sulfonate, maleic anhydride and acrylate of ethylene oxide. Cement slurries containing the retarder and retarder aid may be used for both primary-cementing and remedial-cementing applications.

13 Claims, No Drawings

COMPOSITIONS AND METHODS FOR WELL CEMENTING

CROSS-REFERENCED APPLICATIONS

This application claims the benefit of the disclosure of European Patent Application N° EP10290376.2 filed on Jul. 7, 2010 incorporated by reference in its entirety.

BACKGROUND

The statements in this section merely provide background information related to the present disclosure and may not constitute prior art.

This disclosure relates to compositions and methods for treating subterranean formations, in particular, compositions and methods for cementing subterranean wells.

Portland cement systems for well cementing are routinely designed to perform at temperatures ranging from below freezing in wells involving permafrost zones to 350° C. in geothermal and thermal-recovery wells. Well cements encounter the pressure range from near ambient in shallow wells to more than 200 MPa in deep wells. In addition to severe temperatures and pressures, well cements must often be designed to contend with weak or porous formations, corrosive fluids and overpressured formation fluids. Cement additives make it possible to accommodate such a wide range of conditions. Additives modify the behavior of the cement system, ideally allowing successful slurry placement, rapid strength development and adequate zonal isolation throughout the lifetime of the well.

Today more than 100 additives for well cements are available, many of which may be supplied in solid or liquid forms. A thorough presentation of cement additives for well cementing may be found in the following publication: Nelson E B, Michaux M and Drochon B: "Cement Additives and Mechanisms of Action," in Nelson E B and Guillot D (eds.): *Well Cementing*, $2^{nd}$ Edition, Schlumberger, Houston (2006) 49-91. The present document is concerned with additives that control the rate at which Portland cement slurries hydrate, set and develop strength.

Portland-cement hydration comprises exothermic reactions; therefore, the hydration rate may be measured by an isothermal conduction calorimeter. Heat flow is recorded as a function of time. Faster hydration is indicated by higher heat flow. Portland cement hydration is arbitrarily defined by five stages. Stage I, the preinduction period, begins as the Portland-cement powder is mixed with water. The duration is short—on the order of a few minutes. A large exotherm is observed resulting from the wetting of the powder and the rapidity of the initial hydration reactions. Stage II, the induction period, is a period during which cement hydration slows temporarily. In the context of well cementing, pumping of the slurry occurs during the induction period. Stage III, the acceleration period, is the time at which the slurry begins to set and develop strength. Hydration is more intense as evidenced by the higher heat flow. Eventually a continuous layer of hydrates forms around the cement particles. The layer thickens with time and the hydration rate is controlled by diffusion of water and ions through the layer. This marks the beginning of Stage IV, the deceleration period, during which strength development continues. Stage V, the diffusion period, is characterized by continued hydration at a slow pace. Further details about the chemistry of Portland cement hydration may be found in the following publication: Nelson E B and Michaux M: "Chemistry and Characterization of Portland Cement," in Nelson E B and Guillot D (eds.): *Well Cementing*, $2^{nd}$ Edition, Schlumberger, Houston (2006) 23-48.

Cement retarders are generally used when the cement slurry is exposed to a high-temperature environment. The role of the retarder is to lengthen the thickening time, giving the operator sufficient time to properly place the cement slurry in the well. Therefore, retarders extend the induction period and often decrease the intensity of the acceleration period. Common retarders include lignosulfonates, hydroxycarboxylic acids, saccharides, cellulose derivatives and/or organophosphonates.

The depths of many oil and gas wells may be several thousand meters. Due mainly to the geothermal gradient, bottomhole temperatures of these wells may exceed 260° C. (500° F.). Cementing at such high temperatures requires particularly powerful cement retarders; otherwise, the cement slurry may thicken and set prematurely. The magnitude of the challenge may be illustrated by the fact that, at such high temperatures, the thickening time of a cement slurry usually decreases by about 50% for every 14° C. (25° F.) increase in bottomhole circulating temperature (BHCT).

Recently, operators have begun to drill oil and gas wells with even higher bottomhole temperatures. In response, the well-cementing industry has been challenged to provide retarders that can function at temperatures and pressures as high as 316° C. (600° F.) BHCT.

The formation pressure is generally very high in deep wells—up to about 241 MPa (35,000 psi). To maintain well control and prevent formation-fluid invasion, the hydrostatic pressure of the cement-slurry column in the well must be higher than that of the formation. Thus, the cement-slurry density frequently exceeds $2160 \text{ kg/m}^3$ (18 lbm/gal), and may be as high as $2760 \text{ kg/m}^3$ (23 lbm/gal). Such high densities are achieved by adding weighting agents to the cement slurry. Common weighting agents include hematite, ilmenite, barite and/or manganese tetraoxide. For adequate pumpability and placement, the cement slurry must have acceptable rheological properties. The presence of weighting agents poses a challenge in this respect, and cement dispersants are frequently included in the slurry. In addition, the particle sizes of the cement-slurry solids may be optimized to minimize the slurry viscosity, yet avoid particle settling and sedimentation. The optimized-particle-size concept is exemplified by Cem-CRETE™ concrete-based oilwell cementing technology, available from Schlumberger.

In such cases, it would be preferable if other additives such as retarders do not increase the slurry viscosity. Indeed, it would be particularly preferred if the retarders had a dispersing effect in addition to their ability to control cement hydration.

For many years, organophosphonate-base retarders have been particularly useful when cementing wells with BHCTs higher than about 150° C. (300° F.). These retarders are often accompanied by borate salts (e.g., sodium tetraborate, sodium pentaborate, boric acid, or potassium pentaborate). However, these systems alone are usually difficult to use at BHCTs higher than about 250° C. (482° F.). The temperature range may be extended to about 288° C. (550° F.) by adding a copolymer of AMPS (2-acrylamido-2-methylpropane-3-sulfonic acid) and acrylic acid or acrylamide. Such copolymers are better known as fluid-loss-control additives.

However, despite the valuable contributions of the prior art, extending the practical temperature range of organophosphonate/borate retarders beyond about 288° C. has remained an elusive goal.

SUMMARY

The present disclosure aims at cement systems that may be used at temperatures and pressures up to and exceeding 316° C. (600° F.) and 207 MPa (30,000 psi).

Embodiments relate to methods of controlling the thickening time of a cement slurry.

Further embodiments relate to methods for cementing a subterranean well comprising a borehole wall.

Yet further embodiments relate to methods for completing a subterranean well comprising a borehole wall.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

The inventors have surprisingly discovered that the useful temperature range of phosphonate/borate cement retarders may be increased by including a retarder aid in the cement slurry. The retarder aid is a terpolymer of styrene sulfonate, maleic anhydride and acrylate of polyethylene oxide. The ethylene-oxide number is 13, and the terpolymer molecular weight is preferably between about 3000 and 6000. In addition, the molar-concentration ratio between styrene sulfonate and maleic anhydride is preferably about 1. Additionally, the preferred molar concentration of the acrylate of polyethylene oxide is about 4.8 mol %. The terpolymer concentration in the cement slurry is preferably between 0.1% and 10% by weight of the solids in the slurry (commonly called by weight of blend, or BWOB). A more preferred terpolymer-concentration range lies between about 0.1% and 2.0% BWOB.

The cement slurry to which the retarder aid is added comprises Portland cement, water, at least one borate compound and at least one phosphonate compound. Suitable borate compounds include, but are not limited to, boric acid, tetraborate salts, pentaborate salts and metaborate salts. The borate salts may or may not include waters of hydration. The preferred borate compound is sodium pentaborate decahydrate.

Suitable phosphonate compounds include, but are not limited to, amino trimethylene phosphonic acid (ATP), 1-hydroxyethylidene-1,1,-disphosphonic acid (HEDP), ethylene diamine tetramethylene phosphonic acid (EDTMP), diethylene triamine pentamethylene phosphonic acid (DTPMP), polyamino phosphonic acid, and bis(hexamethylene triamine pentamethylene phosphonic acid). Salts of the phosphonic acid are also suitable. The preferred phosphonate compound is EDTMP.

Embodiments relate to methods of controlling the thickening time of cement slurries. The methods comprise providing a terpolymer of styrene sulfonate, maleic anhydride and acrylate of polyethylene oxide, and mixing the terpolymer with the cement slurry. The cement slurry comprises Portland cement, water, at least one borate compound and at least one phosphonate compound.

Further embodiments relate to methods for cementing a subterranean well comprising a borehole wall. The methods comprise providing a terpolymer of styrene sulfonate, maleic anhydride and acrylate of polyethylene oxide, mixing the terpolymer with the cement slurry and placing the cement slurry into the well. The cement slurry comprises Portland cement, water, at least one borate compound and at least one phosphonate compound.

Yet further embodiments relate to methods for completing a subterranean well comprising a borehole wall. The methods comprise providing a terpolymer of styrene sulfonate, maleic anhydride and acrylate of polyethylene oxide, mixing the terpolymer with the cement slurry and placing the cement slurry into the well. The cement slurry comprises Portland cement, water, at least one borate compound and at least one phosphonate compound.

For all aspects, the terpolymer molecular weight may be between about 3000 and 6000, the molar-concentration ratio between styrene and maleic anhydride may be about 1, and the molar concentration of the acrylate of polyethylene oxide may be about 4.8 mol %. The terpolymer concentration in the cement slurry may be between about 0.1% and 2% BWOB. The preferred concentration range may be between about 0.1% and 1% BWOB. One of the borate compounds may be sodium pentaborate, and one of the phosphonate compounds may be EDTMP.

The various embodiments are particularly applicable to wells with circulating temperatures from 232° C. (450° F.) to at least 302° C. (575° F.), and at hydrostatic pressures up to at least 127 MPa (30,000 psi).

The cement slurry may further comprise weighting agents such as, but not limited to, barite, hematite, ilmenite and manganese tetraoxide, and the cement-slurry density may be as high as 2756 kg/m$^3$ (23 lbm/gal). At such high densities, the cement-slurry design may involve optimizing the particle-size distribution of the ingredients to achieve acceptable rheological properties. This process is exemplified by CemCRETE™ technology, available from Schlumberger.

Those skilled in the art will recognize that the cementing and completion methods may comprise primary cementing, remedial cementing or both.

EXAMPLES

The following example serves to further illustrate the disclosure.

Example 1

A basic cement blend was prepared with the following composition: 33% BYOB (by volume of blend) Texas Lehigh Class H cement, 41% BYOB coarse silica (200 mesh), 10% BYOB fine silica (at least 50% less than 6.5 μm in size), 9% BYOB coarse hematite (Densfil CG, available from Densimix Inc., Houston, Tex., USA) and 7% BYOB medium-size hematite (PMR 300, available from Plomp Mineral Services BV, Sleeuwijk, The Netherlands). Other materials were added to the basic cement blend as a percentage by weight of the solid blend (BWOB). The additives and concentrations are shown in Table 1. The phosphonate compound was the sodium/calcium salt of EDTMP (DEQUEST™ 2047, available from Solutia, St. Louis, Mo., USA). The molecular weight of the terpolymer was about 4000. The mix fluid was tap water.

TABLE 1

Additives and Performance of Example 1 Slurry

| | |
|---|---|
| Antifoam Agent (% BWOB) | 0.2 |
| Bentonite (% BWOB) | 1.5 |
| Sodium Pentaborate Decahydrate (% BWOB) | 1.8 |
| DEQUEST ™ 2047 (% BWOB) | 0.3 |
| Terpolymer (% BWOB) | 0.75 |
| Rotational Viscometer Readings at 85° C. | |
| 300 RPM | 125 |
| 200 RPM | 94 |
| 100 RPM | 63 |
| 60 RPM | 50 |
| 30 RPM | 38 |
| API Free Fluid at 85° C. (%) | 0.08 |
| Thickening Time at 302° C. and 140 MPa (hr:min) | 4:44 |

Testing was conducted in accordance with standard procedures published by the International Organization for Standards (ISO). The test methods are described in the following document: ISO 10426-2. The cement slurry was mixed at a density of 2277 kg/m³ (19 lbm/gal). After mixing, the cement slurry was conditioned in an atmospheric consistometer for 20 minutes at 85° C. After the conditioning period, the rheological properties were measured at 85° C. The apparatus was a Chan 35 rotational viscometer, available from Chandler Engineering, Broken Arrow, Okla., USA. To accommodate the coarse particles in the slurry, the rotor and bob geometry was R1B5. The dial readings at various rotational speeds are shown in Table 1.

Another portion of cement slurry was conditioned in an atmospheric consistometer for 20 minutes at 85° C., then placed in a vertical closed cylinder and left static in an 85° C. oven. The volume of free fluid was measured after 2 hours (Table 1).

A pressurized consistometer was used to measure the thickening time of the slurry. The initial hydrostatic pressure in the consistometer was 13.8 MPa (2000 psi) and the final pressure was 140 MPa (20,300 psi). The initial temperature was 25° C. (77° F.) and the final temperature was 302° C. (575° F.). The time to reach the final hydrostatic pressure was 90 minutes, and the time to reach the final temperature was 120 minutes. The cement slurry was maintained at the final temperature and pressure until the viscosity reached 100 Bearden units. The result is shown in Table 1.

Although various embodiments have been described with respect to enabling disclosures, it is to be understood the disclosed embodiments are not limiting. Variations and modifications that would occur to one of skill in the art upon reading the specification are also within the scope of the disclosure, which is defined in the appended claims.

The invention claimed is:

1. A method for cementing a subterranean well comprising a borehole, comprising:
    (i) providing a terpolymer of styrene sulfonate, maleic anhydride and acrylate of polyethylene oxide;
    (ii) mixing the terpolymer with the cement slurry, whose composition comprises Portland cement, water, at least one borate compound and at least one phosphonate compound; and
    (iii) placing the cement slurry into the well.

2. The method of claim 1, wherein the terpolymer molecular weight is between about 3000 and 6000.

3. The method of claim 1, wherein the molar-concentration ratio between styrene sulfonate and maleic anhydride is about 1.

4. The method of claim 1, wherein the molar concentration of the acrylate of polyethylene oxide is about 4.8 mole percent.

5. The method of claim 1, wherein the terpolymer concentration is between about 0.1 and 10 percent by weight of solids in the slurry.

6. The method of claim 1, wherein the borate compound is sodium pentaborate.

7. The method of claim 1, wherein the phosphonate compound is ethylene diamine tetramethylene phosphonate (EDTMP).

8. A method for completing a subterranean well comprising a borehole, comprising:
    (i) providing a terpolymer of styrene sulfonate, maleic anhydride and acrylate of polyethylene oxide;
    (ii) mixing the terpolymer with the cement slurry, whose composition comprises Portland cement, water, at least one borate compound and ethylene diamine tetramethylene phosphonate (EDTMP); and
    (iii) placing the cement slurry into the well.

9. The method of claim 8, wherein the terpolymer molecular weight is between about 3000 and 6000.

10. The method of claim 8, wherein the molar-concentration ratio between styrene sulfonate and maleic anhydride is about 1.

11. The method of claim 8, wherein the molar concentration of the acrylate of polyethylene oxide is about 4.8 mole percent.

12. The method of claim 8, wherein the terpolymer concentration is between about 0.1 and 10 percent by weight of solids in the slurry.

13. The method of claim 8, wherein the borate compound is sodium pentaborate.

* * * * *